United States Patent
Ta-Shuo

(10) Patent No.: US 6,765,362 B2
(45) Date of Patent: Jul. 20, 2004

(54) BATTERY CHARGING SYSTEM FOR A PERSONAL MOBILE ELECTRICAL APPARATUS

(76) Inventor: Chang Ta-Shuo, P.O. Box 24-108, Taipei (TW)

( * ) Notice: Subject to any disclaimer, the term of this patent is extended or adjusted under 35 U.S.C. 154(b) by 0 days.

(21) Appl. No.: 10/295,048

(22) Filed: Nov. 15, 2002

(65) Prior Publication Data

US 2004/0095092 A1 May 20, 2004

(51) Int. Cl.$^7$ ............................................. H01M 10/46
(52) U.S. Cl. ...................................................... 320/104
(58) Field of Search ................................ 320/101, 103, 320/104, 135, DIG. 33, DIG. 34; 310/67 A, 67 R, 156; 290/1 R, 1 B, 1 D, 46, 50

(56) References Cited

U.S. PATENT DOCUMENTS

| | | | | |
|---|---|---|---|---|
| 2,488,021 A | * | 11/1949 | May | .......................... 310/75 C |
| 4,860,176 A | * | 8/1989 | Bauwens et al. | .......... 310/67 A |
| 4,950,971 A | * | 8/1990 | Hegi et al. | ....................... 322/1 |
| 5,680,026 A | * | 10/1997 | Lueschen | ...................... 429/97 |
| 5,833,534 A | * | 11/1998 | Lai | ............................. 362/473 |
| 6,486,582 B1 | * | 11/2002 | Patarchi | ...................... 310/166 |

* cited by examiner

Primary Examiner—Edward H. Tso
(74) Attorney, Agent, or Firm—Troxell Law Office PLLC

(57) ABSTRACT

A bicycle power supply and charger system including a dynamo adapted to generate power supply upon operation of the bicycle, a rectifier output voltage regulator adapted to convert output power of the dynamo into the desired DC output power, an electric connector adapted to receive a personal mobile electrical apparatus and to transmit the DC output power from the rectifier output voltage regulator to the personal mobile electrical apparatus, and a battery charger holder connectable to the electric connector and adapted to charge the battery of a personal mobile electrical apparatus.

3 Claims, 2 Drawing Sheets

BATTERY CHARGING SYSTEM FOR A PERSONAL MOBILE ELECTRICAL APPARATUS

BACKGROUND OF THE INVENTION

1. Field of the Invention

The present invention relates to bicycles and, more particularly to a power supply and charger system for use with a bicycle to generate power supply upon running of the bicycle and, to charge the battery of a personal mobile electric apparatus.

2. Description of the Related Art

In order to save energy and to reduce pollution, many people recommend the use of a bicycle as one's personal transportation vehicle. People may exercise the body by riding a bicycle. Further, riding a bicycle in the wild field is the favorite recreation of many people. When riding a bicycle outdoors, the rider may carry a cellular telephone, radio, PDA, or any of a variety of personal mobile electric apparatus. When the battery charge is low, the personal mobile electric apparatus becomes unable to work. It is inconvenient to carry a supplementary battery for one's personal mobile electric apparatus when riding a bicycle.

SUMMARY OF THE INVENTION

The present invention has been accomplished under the circumstances in view. According to one aspect of the present invention, the power supply and charger system includes a dynamo adapted to generate power supply upon running of the bicycle, a rectifier output voltage regulator adapted to convert output power of the dynamo into the desired DC output power, and an electric connector adapted to receive a personal mobile electric apparatus and to transmit the DC output power from the rectifier output voltage regulator to the personal mobile electric apparatus. According to another aspect of the present invention, a battery charger is provided for connection to the electric connector to charge the battery of a personal mobile electric apparatus.

DETAILED DESCRIPTION OF THE PREFERRED EMBODIMENT

Figure 1:
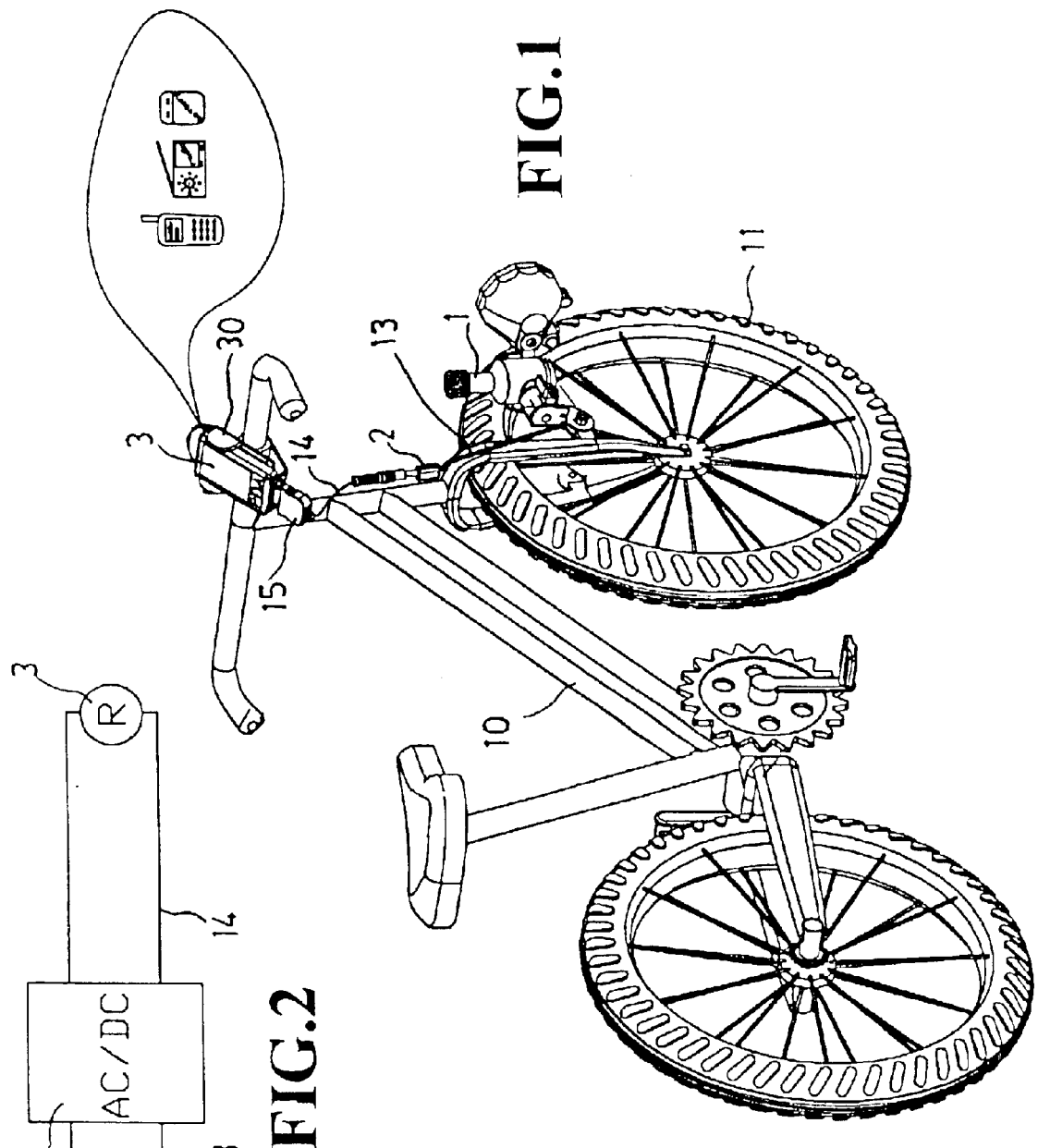
FIG. 1 is an installed view of the present invention showing the power supply and charger system installed in a bicycle.
Figure 2:
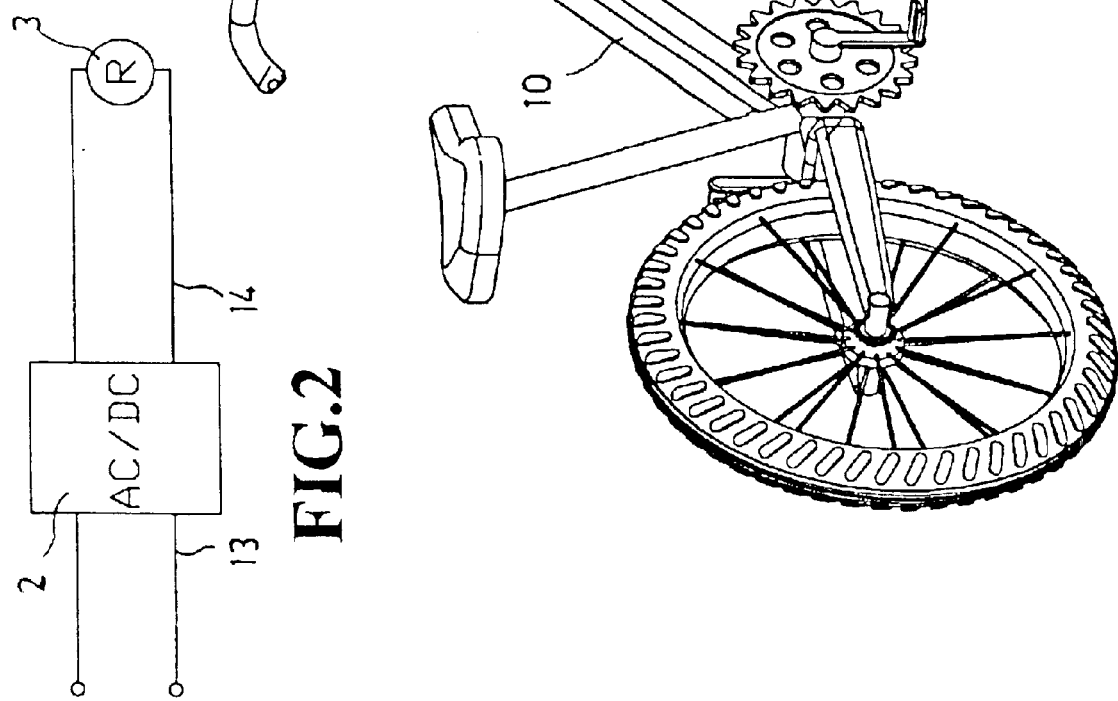
FIG. 2 is a circuit diagram of the present invention.
Figure 3:
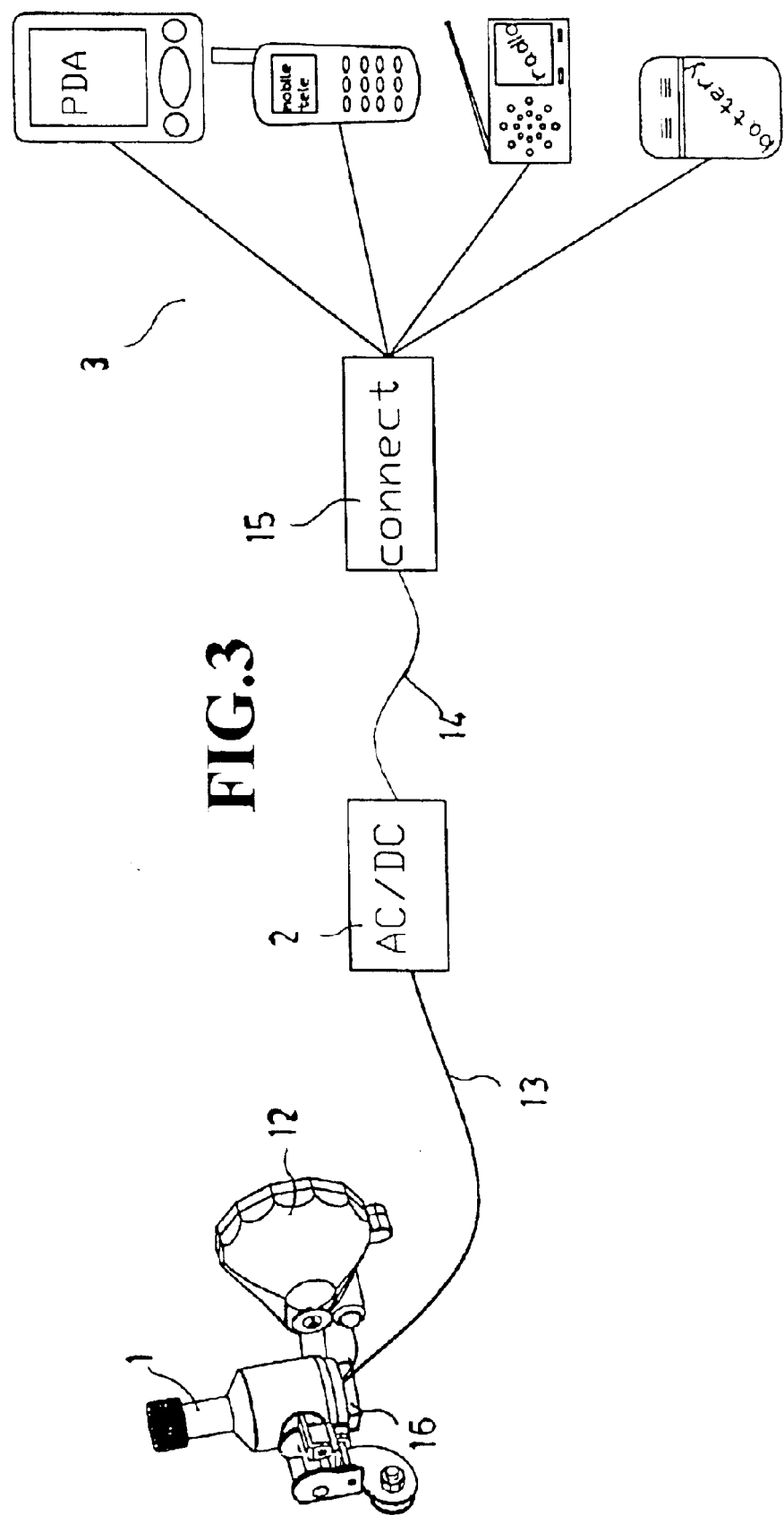
FIG. 3 is a circuit block diagram of the present invention.

Referring to FIGS. 1–3. the present invention comprises a dynamo 1, a rectifier output voltage regulator 2, and a cable 15.

The dynamo 1 is installed on a bicycle 10 at one side of the front wheel 11 (keeping the rotor wheel of the dynamo 1 in close contact with the front wheel 11). During operation of the bicycle 10, the front wheel 11 rotates the rotor wheel of the dynamo 1, causing the dynamo 1 to generate power for the bicycle lamp 12. An electric wire 13 is connected between the dynamo 1 and the rectifier output voltage regulator 2, enabling the rectifier output voltage regulator 2 to receive output power supply from the dynamo 1 and to convert received power supply into the desired DC voltage.

The cable 14 has one end connected to the output end of the rectifier output voltage regulator 2, and the other end terminating in an electric connector 15 connectable to a power jack of a personal mobile electric apparatus (for example, a cellular telephone, walkie-talkie, radio, PDA, or the like) 3. A battery charger holder 30 may be connected to the electric connector 15 to charge the battery of a personal mobile electric apparatus 3. The battery charger holder 30 is mountable to the handlebars of the bicycle 10. Further, a selector switch 16 is provided for switching output of the dynamo 1 between the bicycle lamp 12 and the rectifier output voltage regulator 2 and controlling voltage output of the rectifier output voltage regulator 2.

After installation of the power supply and charger system in the bicycle 10, the personal mobile electric apparatus 3 is put in the battery charger holder 30, and the switch 16 is switched to the rectifier output voltage regulator 2 and set in the position subject to the desired output voltage level. When riding the bicycle, the output power of the dynamo 1 is rectified by the rectifier output voltage regulator 2 and converted into the desired working voltage to charge the personal mobile electric apparatus 3 through the battery charger holder 30 via the electric connector 15.

A prototype of power supply and charger system for bicycle has been constructed with the features of FIGS. 1–3. The power supply and charger system for bicycle functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A battery charging system for charging a battery of a personal mobile electrical apparatus connected to a bicycle, the battery charging system comprising:

a) a dynamo connected to a wheel of the bicycle and generating a power supply when the bicycle is operated, the dynamo being electrically connected to at least one bicycle lamp;

b) a rectifier output voltage regulator electrically connected to the dynamo and producing a DC output power;

c) an electric connector electrically connected to the rectifier output voltage regulator and removably connected to the personal mobile electrical apparatus for charging the battery of the personal mobile electrical apparatus; and d) a battery charger holder connected to the electric connector and the bicycle, and releasably holding the personal mobile electrical apparatus, wherein the battery of the personal mobile electrical apparatus is charged by the DC output power produced by the rectifier output voltage regulator.

2. The battery charging system according to claim 1, further comprising a switching device selectively supplying the DC output power between the at least one bicycle lamp and the rectifier output voltage regulator.

3. The battery charging system according to claim 1, further comprising a switching device selectively controlling an output voltage level produced by the rectifier output voltage regulator.

* * * * *